(12) United States Patent
Lancaster et al.

(10) Patent No.: US 10,095,473 B2
(45) Date of Patent: Oct. 9, 2018

(54) INTENT MANAGING SYSTEM

(71) Applicant: HONEYWELL INTERNATIONAL INC., Morris Plains, NJ (US)

(72) Inventors: Jeff Lancaster, Cummings, IA (US); Robert E De Mers, Nowthen, MN (US); Erik T Nelson, Eden Prairie, MN (US); Chaya Garg, Plymouth, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 315 days.

(21) Appl. No.: 14/931,352

(22) Filed: Nov. 3, 2015

(65) Prior Publication Data

US 2017/0123757 A1 May 4, 2017

(51) Int. Cl.
B60R 16/037 (2006.01)
G06F 3/16 (2006.01)
(Continued)

(52) U.S. Cl.
CPC .......... G06F 3/167 (2013.01); B60R 16/0373 (2013.01); G06F 3/013 (2013.01);
(Continued)

(58) Field of Classification Search
CPC . G06F 3/013; G06F 3/16; G06F 3/015; G06F 3/167; G10L 15/22;
(Continued)

(56) References Cited

U.S. PATENT DOCUMENTS 7,340,399 B2    3/2008 Friedrich et al.
7,606,715 B1 * 10/2009 Krenz ................ 704/275
(Continued)

FOREIGN PATENT DOCUMENTS

EP    1154406 A1    11/2001
EP    1333426 A1     8/2003
EP    2806335 A1    11/2014

OTHER PUBLICATIONS

Costanza et al., "Intimate Interfaces in Action: Assessing the Usability and Subtlety of EMG-based Motionless Gestures", 2007, ACM, 819-828.*

(Continued)

Primary Examiner — Aaron Lowenberger
(74) Attorney, Agent, or Firm — Lorenz & Kopf, LLP

(57) ABSTRACT

An intent managing system and a method for operating the same are provided. The system, for example, may include, but is not limited to a processor communicatively coupled to an input system and a memory. The processor may be configured to receive a voice command, determine how many of a plurality of voice controllable systems utilize the voice command, automatically select one of the plurality of voice controllable systems, generate an indication of the selected one of the plurality of voice controllable systems, receive, from the at least one input system, confirmation of the selected one of the plurality of voice controllable systems, and execute the received voice command at the selected one of the plurality of voice controllable systems when the confirmation is received.

20 Claims, 3 Drawing Sheets

(51) Int. Cl.
*G06F 3/01* (2006.01)
*G06K 9/00* (2006.01)
*G10L 15/22* (2006.01)

(52) U.S. Cl.
CPC ............. *G06F 3/015* (2013.01); *G06F 3/16* (2013.01); *G06K 9/00302* (2013.01); *G06K 9/00342* (2013.01); *G06K 9/00355* (2013.01); *G10L 15/22* (2013.01); *G10L 2015/223* (2013.01)

(58) Field of Classification Search
CPC .......... G10L 2015/223; B60R 16/0373; G06K 9/00302; G06K 9/00342; G06K 9/00355
See application file for complete search history.

(56) References Cited

U.S. PATENT DOCUMENTS

| | | | |
|---|---|---|---|
| 8,036,917 | B2 | 10/2011 | Kariathungal et al. |
| 8,224,653 | B2* | 7/2012 | De Mers ................. G10L 15/01 704/275 |
| 8,929,954 | B2 | 1/2015 | Jacobsen et al. |
| 9,550,578 | B2* | 1/2017 | McCullough ........ G08G 5/0021 |
| 9,824,689 | B1* | 11/2017 | Shapiro ................... G10L 15/22 |
| 9,830,910 | B1* | 11/2017 | Shapiro ................ G10L 15/265 |
| 2008/0244465 | A1* | 10/2008 | Kongqiao ............... G06F 3/017 715/863 |
| 2011/0093821 | A1* | 4/2011 | Wigdor ............... G06F 3/04812 715/863 |
| 2011/0205148 | A1* | 8/2011 | Corriveau ............... G06F 3/013 345/156 |
| 2012/0110456 | A1* | 5/2012 | Larco ...................... G06F 3/167 715/728 |
| 2013/0231127 | A1* | 9/2013 | Kildal ................ G01C 21/3626 455/456.1 |
| 2015/0006184 | A1* | 1/2015 | Marti ...................... G10L 25/63 704/275 |
| 2015/0217870 | A1 | 8/2015 | McCullough et al. |
| 2015/0220142 | A1 | 8/2015 | Parkinson et al. |

OTHER PUBLICATIONS

Hatfield, F., et al. "An interface integrating eye gaze and voice recognition for hands-free computer access," The CSUN Technology and Persons with Disabilities conference, Nov. 30, 1997.
Khandar, D., "Haar Based Head Movement Tracking with Voice commands for Computer control," International Journal for Research in Applied Science & Engineering, Mar. 2015.
Nuance, "Ford and Nuance Collaborate to Advance In-Car Voice Interactions through Understanding and Intent," Jun. 21, 2011.
Eye Talk Systems Inc., "Eye Voice (TM)," 2015.
Extended EP Search Report for Application No. 16195188.4-1901 dated Mar. 4, 2017.

* cited by examiner

INTENT MANAGING SYSTEM

TECHNICAL FIELD

The present disclosure generally relates to vehicles, and more particularly relates to voice controllable sub-systems of a vehicle.

BACKGROUND

Vehicle operation, in particular aircraft operation, can be a complicated process. Pilots and drivers of other vehicles may have to perform numerous tasks simultaneously during critical periods. In order to simplify vehicle operation, numerous systems of the vehicles may be controllable via voice commands.

BRIEF SUMMARY

In one embodiment, for example, an intent managing system for a vehicle comprising a plurality of voice controllable systems is provided. The intent managing system may include, but is not limited to, at least one input system, a memory configured to store valid voice commands for each of the plurality of voice controllable systems, and a processor communicatively coupled to the at least one input system and the memory, the processor configured to receive a voice command from the at least one input system, determine how many of the plurality of voice controllable systems include the received voice command as a valid voice command, select, when the received voice command is a valid voice command for only one of the plurality of voice controllable systems, the one of the plurality of voice controllable systems, select, when the received voice command is a valid voice command for a plurality of the plurality of voice controllable systems, one of the plurality of voice controllable systems based upon one or more of a user profile and data from one or more of the plurality of voice controllable systems, generate at least one of a visual indication of the selected one of the plurality of voice controllable systems and an audio indication of the selected one of the plurality of voice controllable systems, receive, from the at least one input system, confirmation of the selected one of the plurality of voice controllable systems, and execute the received voice command at the selected one of the plurality of voice controllable systems when the confirmation is received.

In another embodiment, for example, a method for operating an intent managing system for a vehicle comprising a plurality of voice controllable systems is provided. The method may include, but is not limited to, receiving, by a processor, a voice command from an input system, determining, by the processor, how many of the plurality of voice controllable systems include the received voice command as a valid voice command, selecting, by the processor, one of the plurality of voice controllable systems when the received voice command is a valid voice command for only the one of the plurality of voice controllable systems, selecting, by the processor, one of the plurality of voice controllable systems based upon one or more of a user profile and data from one or more of the plurality of voice controllable systems when the received voice command is a valid voice command for a plurality of the plurality of voice controllable systems, generating, by the processor, at least one of a visual indication of the selected one of the plurality of voice controllable systems and an audio indication of the selected one of the plurality of voice controllable systems, receiving, by the processor from the input system, confirmation of the selected one of the plurality of voice controllable systems, and executing, by the processor, the received voice command at the selected one of the plurality of voice controllable systems when the confirmation is received.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

An intent managing system for a vehicle and a method for operating an intent managing system are discussed herein. The vehicle may include numerous systems which can be controlled by a user's voice. Many of the voice commands that the numerous voice controlled systems may accept may be valid for multiple voice controllable systems. Accordingly, the intent managing system determines and confirms which of voice controlled systems a user is attempting to control.

Figure 1:
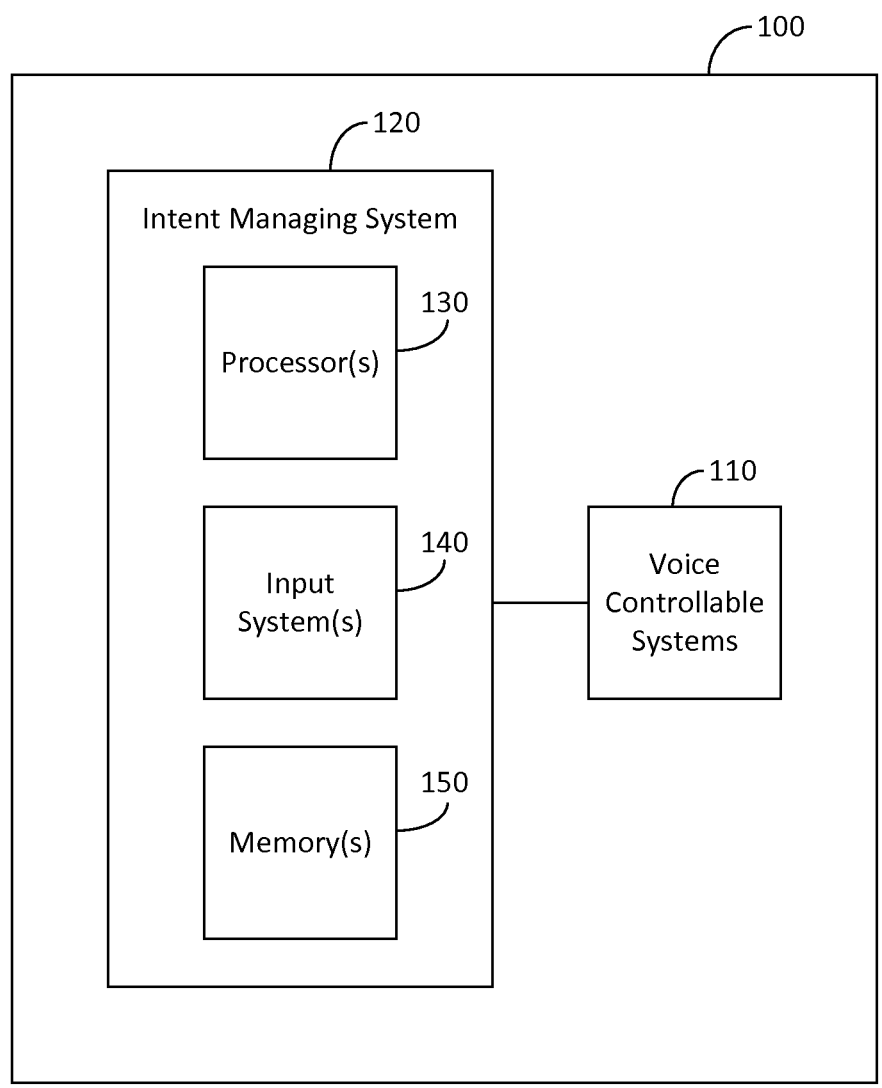
FIG. 1 is a block diagram of an exemplary vehicle in accordance with an embodiment.

FIG. 1 is a block diagram of an exemplary vehicle 100 in accordance with an embodiment. In one embodiment, for example, the vehicle 100 may be an aircraft. However, in other embodiments, the vehicle may be a spacecraft, a helicopter, a watercraft, an automobile, a motorcycle, or the like.

The vehicle includes multiple voice controllable systems 110. An aircraft, for example, may have a charts system, a map system (e.g., Interactive Navigation [INAV]), a radio system, a multifunction control display unit (MCDU), a checklist system, a weather system, a repair and overhaul system, a datalink system, an air traffic control (ATC) clearance and communications system, a flight services system, or various other systems or any combination thereof. Likewise, other types of vehicles could have multiple voice controllable systems 110 which would vary depending upon the vehicle. While many of the voice controllable systems 110 could have voice commands unique to each voice controllable system 110, many voice controllable systems 110 may have voice commands in common. In particular, basic commands such as "menu," "home," "help," "next," "back", "zoom", "pan", "close", rotate," or the like may be used by multiple voice controllable systems 110.

Accordingly, the vehicle 100 further includes an intent managing system 120 which determines an intent of the voice command. In other words, the intent managing system 120 determines which of the voice controllable systems 110 the user is intending to communicate with.

The intent managing system 120 includes at least one processor 130. The processor 130 may be a central processing unit (CPU), a graphics processing unit (GPU), a field programmable gate array (FPGA), an application specific integrated circuit (ASIC), a microcontroller, or any other logic device or combination thereof. As discussed in further detail below, the processor 130 controls the operation of the intent managing system 120. In one embodiment, the processor 130 may be dedicated to the intent managing system 120. However, in other embodiments, for example, the processor 130 may be utilized by one or more other voice controllable systems 110 or other systems in the vehicle 100.

The intent managing system 120 further includes one or more input systems 140. The input system 140 includes at least one microphone to capture voice commands from a user. In one embodiment, for example, the input system 140 may also include one or more cameras. The camera(s) may be optical cameras, infrared (IR) cameras, or the like, or any combination thereof. In another embodiment, for example, the input system 140 may include an electromyography (EMG) system. In yet another embodiment, for example, the input system 140 may include one or more weight sensors. Any combination of input systems could be utilized. As discussed in further detail below, the processor 130 can use data output by the one or more input systems 140 to determine an intent of a voice command and to confirm the intent of the voice command.

The intent managing system 120 further includes at least one memory 150. The memory 150 may be any combination of volatile and non-volatile memory. The memory 150 stores voice commands corresponding to each of the voice controllable systems 110. As discussed in further detail below, the memory 150 may also store a user profile. The user profile may indicate which of the voice controllable systems 110 the user most frequently communicates with for each valid voice command as well as which of the voice controllable systems 110 the user most frequency communicates with in various vehicle situations and circumstances, as discussed in further detail below. The memory 150 may also store non-transitory computer readable instructions for operating the intent managing system 120, as discussed in further detail below.

While FIG. 1 illustrates the intent managing system 120 be integrated into the vehicle, the intent managing system 120 could also be a separate system which communicates with the voice controllable systems 110. For example, the intent managing system 120 could be implemented on a portable device in various form factors, including, but not limited to, tablet devices, cellular phone devices, laptop computing devices, wearable devices (e.g., smart watches, smart glasses, or the like), or the like, or any combination thereof. In these embodiments, the intent managing system 120 may further include a communication system (not illustrated), such as a Bluetooth system, a Wi-Fi system, a LAN system, a ZigBee system, a cellular system, or the like.

Figure 2:
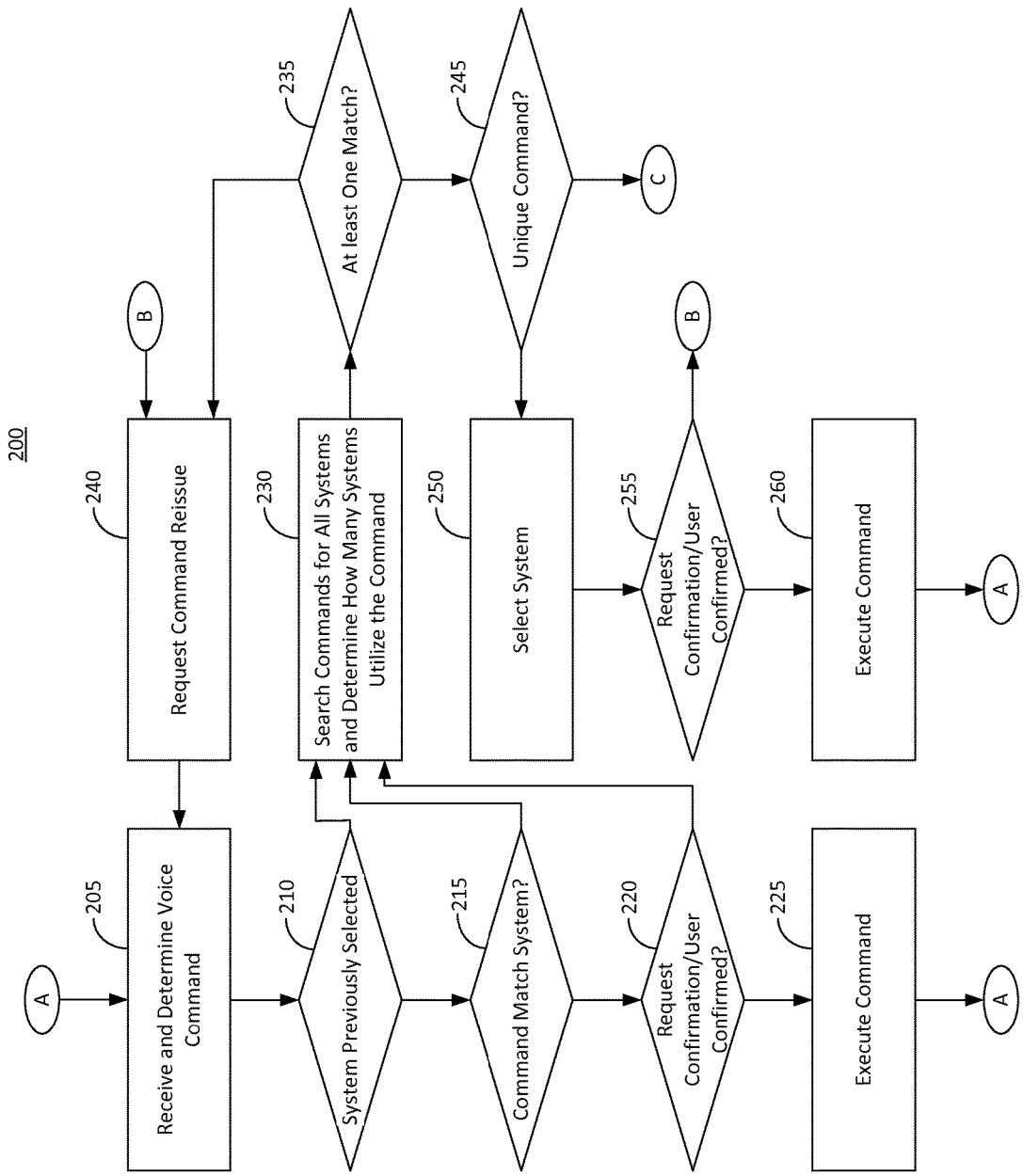
FIGS. 2-3 illustrate a flow diagram illustrating an exemplary method for operating the intent managing system, in accordance with an embodiment.
Figure 3:
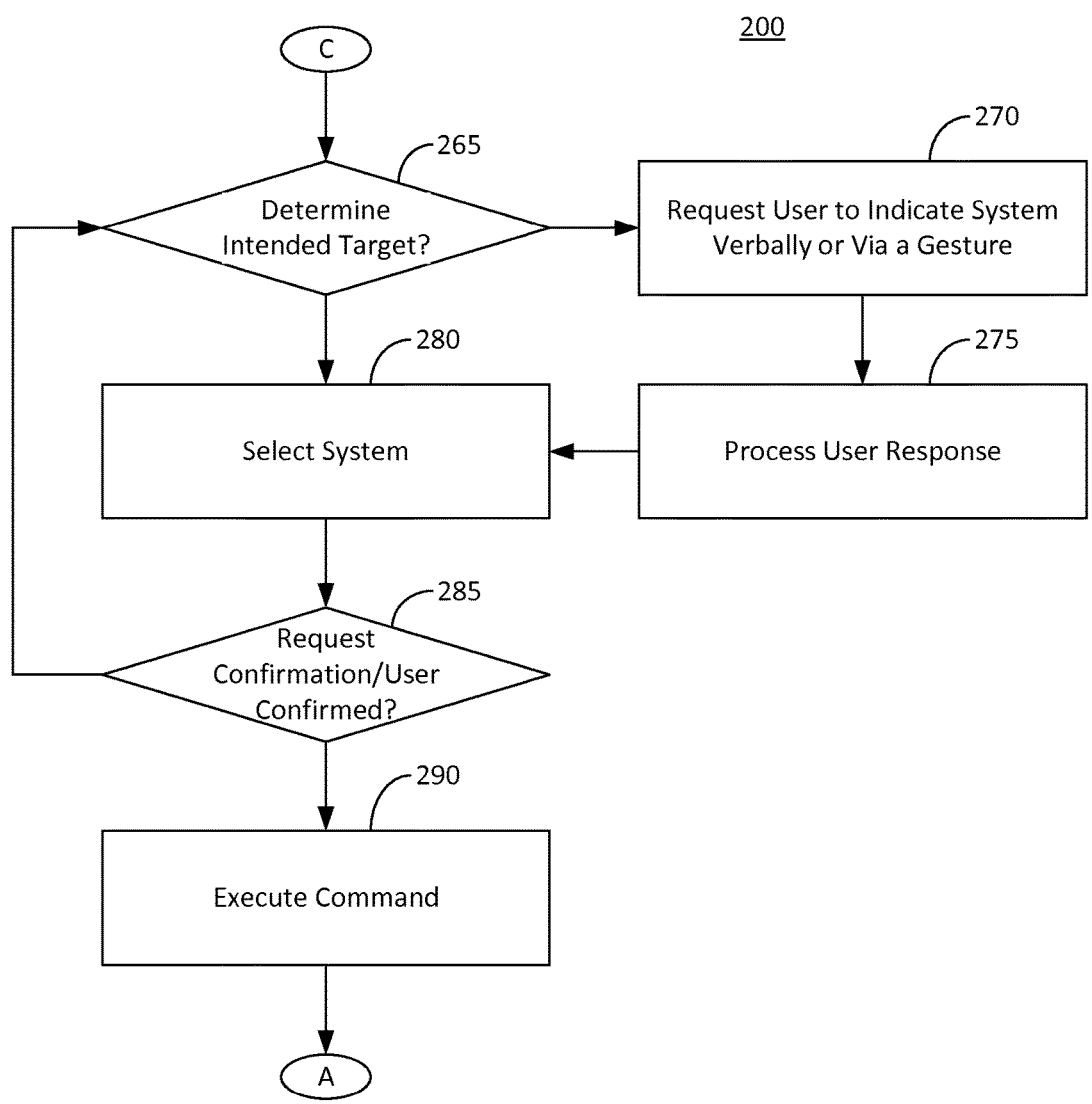

FIGS. 2-3 illustrate a flow diagram illustrating an exemplary method 200 for operating the intent managing system 120, in accordance with an embodiment. The method begins when the processor 130 receives and processes voice command. (Step 205). The voice command can be received through a microphone of the input system 140. Typically, the voice command received by the processor 130 is either an analog or digital signal corresponding to the voice command. The processor 130 determines the voice command issued by the user by performing speech recognition on the received signal to transform the audio signal into text or any other format that can be recognized by the input system 140 or memory 150. Any speech recognition algorithms may be used including, but not limited to, hidden Markov models, dynamic time warping (DTW), neural networks, deep neural networks, or the like.

In one embodiment, for example, the processor 130 then determines if one of the voice controllable systems 110 has previously been selected. (Step 210). In operation, a user issuing several commands in quick succession is likely attempting to interact with the same voice controllable system 110. Accordingly, the processor 130 may store in the memory 150 an indication of a previously selected voice controllable system 110 as well as a time stamp. The time stamp may indicate that a voice controllable system is previously selected for a predetermined amount of time, which may be adjustable by a user or may be fixed in the intent managing system 120. Accordingly, the processor may determine that there is a previously selected system by determining if there is an unexpired previously selected voice controllable system 110 in the memory 150. By processing voice commands of a previously selected system first, as discussed in more detail below, the intent managing system 120 can more quickly respond to repeated commands to the same voice controllable system 110.

In one embodiment, for example, a selected voice controllable system 110 may be audibly indicated (e.g., by outputting an audio signal corresponding to the name of the selected voice controllable system 110) and/or visually indicated on a display corresponding to the voice controllable system 110, a display corresponding to the intent managing system 120 (not illustrated), or via another visualization device in the vehicle 100. The visual indication could be accomplished in a variety of ways, including, but not limited to, turning on and/or flashing a light (e.g., a LED) next to the selected voice controllable system 110, changing a background color of a display corresponding to the voice controllable system 110, listing the selected voice controllable system 110 on the display corresponding to the intent managing system 120, flashing the corresponding display, boxing the corresponding display with various colors, or the like, or any combination thereof. Accordingly, the visual indication of the selection of the voice controllable system provides the user with an indication of which of the voice controllable systems will execute a spoken command. In another embodiment, for example, tactile feedback could be used to indicate the display. For example, one or more tactile feedback devices, such as vibrators or the like, may be placed on a vehicle seat or another vehicle component such as a seat belt. The processor 130 can activate a tactile feedback device corresponding to a specific one voice controllable system 110 to indicate a selection or output a tactical feedback pattern corresponding to a specific one voice controllable system 110 to indicate a selection.

When the memory 150 stores an indication that there is a previously selected voice controllable system 110, the processor 130 then determines in the voice command matches a command of the previously selected voice controllable system 110. (Step 215). In one embodiment, for example, the processor 130 compares the text extracted from the signal received in Step 205 to the voice commands corresponding to the previously selected voice controllable system 110 stored in the memory 150. Any search algorithm could be used by the processor 130 to compare the text extracted from the signal received in Step 205 to the voice commands corresponding to the previously selected voice controllable system 110.

When the voice command corresponds to a command of the previously selected voice controllable system 110, the processor 130 then requests confirmation from the user and determines if the user confirms the command. (Step 220). The processor 130 may request confirmation in numerous ways. For example, the processor 130 may request confirmation visually, verbally, via a tactile output, or a combination thereof. For example, the processor 130 may cause a speaker to output an aural confirmation request to the user. The memory 150 may store either prerecorded audio clips corresponding to the confirmation request or utilize text to speech processing to convert a confirmation request from data into an audible message. A visual confirmation request could include any of the visual indications discussed herein, including, but not limited to color changes, borders, animations, text/dialog boxes, text changes (e.g., normal-to-bold animations, positive/negative animations or the like), or any combination thereof. Tactile confirmation requests can be issued by the processor 130 in a variety of ways. For example, a tactile feedback device could be activated in a predetermined pattern of one or more pulses to indicate that confirmation is requested.

The processor 130 then determines if a user has confirmed the voice command. In one embodiment, for example, a user's head position may be used as input to confirm a command. For example, a user may confirm a command by shifting their head to the right and deny a command by shifting their head to the left, or vice versa. In another embodiment, for example, the user may confirm the command by nodding (i.e., moving their head up and down) and deny a command by shaking their head (i.e., moving their head from left to right). However, any individual or combination of head shifts may be selected to confirm or deny a command.

In another embodiment, for example, a user's body position may be used as input to confirm a command. For example, a user may confirm a command by shifting their body to the right and deny a command by shifting their body to the left, or vice versa. In another embodiment, for example, the user may confirm the command by shifting their body forward and may deny a command by shifting their body backwards. However, any individual or combination of body shifts may be selected to confirm or deny a command.

In another embodiment, for example, the processor 130 may analyze a user's arm position, hand position, or hand expression to confirm or deny a command. For example, if a user points in a certain direction (i.e., up, down, left, right, towards the camera, towards the selected voice controllable system 110, or the like), the processor 130 may interpret the direction the user's arm is arranged to confirm or deny the command. Likewise, if a user were to lift their right arm or left arm the processor 130 could interpret the command as being accepted or denied. Other hand expressions such as thumbs up or thumbs down, raising one or more fingers or the like could also be used to confirm or deny the commands.

In another embodiment, for example, the processor 130 may analyze a user's facial expression to determine if a command is confirmed or denied. For example, if a user smiles the processor 130 may determine the command is confirmed and if the user frowns the processor 130 may determine that the command is denied. In this embodiment, for example, the processor 130 may store a profile for each user including one or more captured images of the user making the facial expressions in the memory 150. The processor 130 may then compare a user's face during the confirmation period to their stored images to determine if the user is confirming or denying a command.

In another embodiment, for example, the processor 130 may monitor a user's eye movements or saccades to then determine if a user is confirming or denying a command. For example, if a user moves their eyes up and down without substantially shifting their head, the processor 130 may determine that the user is confirming the command. Likewise, if the user is moving their eyes left-to-right, the processor 130 may determine that the user is denying the command. In another embodiment, for example, a first predetermined number of blinks of both eyes over a predetermined period of time may be an indication of a confirmation of the command and a second predetermined number of blinks of both eyes over a predetermined period of time may be an indication of denying the command. For example, two blinks over a half of a second in length may be determined to be a confirmation and three blinks over a half of a second in length may be determined to be a denying of the command. In another embodiment, for example, closing a left eye for over a predetermined amount of time (e.g., half a second) may be determined to be a confirmation and closing a right eye for over a predetermined length of time may be determined to be denying the command. In other embodiments, a user crossing their eyes, circular eye movements (e.g., clockwise circles indicating yes and counter-clockwise circles indicating no) or the like to determine if a user is confirming or denying a command. However, any individual or combination of eye movements and blinks may be selected to confirm or deny a command.

In other embodiments, for example, other facial movements, such as eyebrow movements (e.g., upward movement indicating yes, furrowing of brow indicating no), pursing of lips, wiggling of ears, sticking out the tongue, or any other facial movement could be used to indicate a confirmation or denial of a command. Any combination of movements discussed herein could also be used to confirm or deny a command. For example, a blink accompanied by pursing of lips could be used to indicate a confirmation.

In these embodiments, the processor 130 may analyze data from an optical or infrared camera of the input system 140. For example, the processor 130 may utilize principle component analysis (PCA), kernel PCA, weighted PCA, linear discriminant analysis (LDA), kernel LDA, semi-supervised discriminant analysis (SDA), independent component analysis (ICA), neural network based methods, multidimensional scaling (MDS), self-organizing maps (SOM), active shape models (ASM), active appearance models (AAM), Gavor wavelet transforms, discrete cosine transforms (DCT), or the like to extract features from an image. The processor 130 could use exhaustive search, branch and bound, best individual features, sequential forward selection (SFS), sequential backward selection (SBS), plus 1-take away r selection, sequential forward floating search (SFFS, sequential backward floating search (SBFS), or the like to select features from the images. The processor 130 could also use template matching, nearest mean, subspace method, 1-NN, k-NN, (learning) vector quantization, self-organizing map (SOM) methods, Bayesian methods, logistic classifier methods, Parzen classifier methods, Fisher linear discriminant (FLD), perceptron methods, multi-layer perceptron methods, radial basis network methods, support vector machine methods, or the like to classify features from the images.

As discussed above, in various embodiments the input system 140 may include one or more weight sensors. In these embodiments, the processor 130 may analyze data from the weight sensor(s) to determine if a user is confirming or denying a command. For example, if a user shifts their weight forward, backwards, to the left, to the right, or any combination thereof, the processor may determine if a user is confirming or denying a command based upon a weight shifting pattern. For example, if a user is shifting their weight to the left, the processor 130 may interpret that the user is confirming the command and if the user is shifting their weight to the right the processor 130 may interpret that the user is denying the command. However, any individual or combination of weight shifts may be selected to confirm or deny a command.

In other embodiments, for example, the input system 140 may include one or more force transducers. The processor 130 may determine whether or not a command is confirmed based upon a force output by the force transducer(s). For example, a grip force of a predetermined number of newtons on the yoke of an aircraft could be interpreted to confirm a command by the processor 130.

As discussed above, in various embodiments the input system 140 may include one or more EMG sensors. The sensor(s) could be attached to one or more body parts such as arms, neck, calves or the like. The EMG sensor(s) output data to the processor 130 that the processor 130 can interpret into muscle movements. Generally, a surface EMG sensor captures magnitude of electrical activity at muscles or their activation level. The processor 130 can analyze both amplitude and duration of activity against a baseline (at rest typically). For example, the processor may determine that abduction of a user's thighs may confirm a command, adduction of a user's thighs may deny a command, a bicep flex of a first magnitude may confirm a command, a bicep flex of a second magnitude may deny a command, or the like. Any other body parts, including, but not limited to, quadriceps, stomach muscles, and the like could be monitored by the EMG sensor(s).

The processor 130 then determines whether or not a command is confirmed or denied based upon the determined muscle movements. For example, if an EMG sensor was placed on a neck of the user, the processor 130 could detect movements to the left, right, forwards, backwards or combinations of movements such as shaking left-right or nodding up and down and utilize these determined movements to determine if the command were confirmed or denied. Likewise, if sensors were placed on both calves of a user, a flex of the left calf, for example, could be interpreted as denying a command and a flex of the right calf could be interpreted as confirming a command.

In another embodiment, for example, the input system 140 may include an array of microphones. The processor 130 may utilize noise localization techniques to determine if a user is confirming or denying a command. The array of microphones may include a microphone proximate to each of the voice controllable systems 110 or may include microphones at various predetermined locations, for example, one of the left side of the vehicle 100 or a specific vehicle part, and one on the right side of the vehicle or a specific vehicle part. The processor 130 may determine whether a command is confirmed or denied based upon a direction a user is speaking or otherwise making noise. For example, if a user is talking with their head pointing towards the left side of the vehicle 100, the processor 130 may determine that the command is confirmed and when the users is talking towards the right side of the vehicle 100 processor 130 may determine that the command is denied. Likewise, if a user is tapping a left side of a yoke or steering wheel of the vehicle the processor 130 may determine that the command is confirmed and when the user is tapping a right side of a yoke or steering wheel of the vehicle the processor 130 may determine that the command is denied.

When the processor 130 determines that the command was confirmed, the processor causes the voice command at the selected voice controllable system 110 to execute and then returns to step 205 to await further voice commands. (Step 225). In one embodiment, for example, the processor 130 may itself execute the voice command when the processor 130 is part of the corresponding voice controllable system 110. In other embodiments, for example, the processor 130 may generate instructions based upon the received voice command and transmit the instructions to the respective voice controllable system 110 for execution.

If there were no previously selected voice controllable system 110, and the voice command determined in Step 205 doesn't match a valid voice command of the previously selected voice controllable system 110 (or the user denies the command in Step 220), the processor 130 may then search all of the valid voice commands of all of the voice controllable system 110 stored in the memory to determine how many of the voice controllable systems 110 utilize the voice command. (Step 230).

If there is no match (Step 235), the processor 130 requests that the user reissue the command. (Step 240). The processor 130, for example, could output an audible indication, visual indication, or a combination thereof to request the user reissue the command. For example, the processor could output audio data to a speaker (not illustrated) requesting the user reissue the command, the processor 130 may cause one or more displays on the vehicle 100 to blink or display a textual request to speak the command again, or the like, or any combination thereof. The processor 130 then returns to step 205 to await the next voice command.

If the processor 130 determines that there was at least one match in Steps 230 and 235, the processor determines if the command was unique to only one of the voice controllable systems 110. (Step 245). For example, "squawk ident", "split minima" and other unique commands may only be valid for one of the voice controllable systems 110.

When the command is determined to be a unique command, the processor 130 selects the voice controllable system 110 corresponding to the unique command. (Step 250). As discussed above, the processor 130 may indicate a selection of one of the voice controllable system 110 via a visual indicator, an audible indicator or a combination thereof. The processor 130 then requests that the user confirm that the selected voice controllable system 110 is correct. (Step 255). The user can confirm that the selected voice controllable system 110 was the intended voice controllable system 110 in any one or any combination of the ways discussed above with respect to Step 220.

When the user confirms the intended voice controllable system 110, the processor 130 either executes the voice command or generates instructions for executing the voice command, as discussed above. (Step 260). The processor 130 then returns to Step 205 to await a new voice command.

When the user denies the confirmation request in Step 255, the processor 130 requests that the user reissue the command. (Step 240). As discussed above, the processor 130, could output an audible indication, visual indication, or a combination thereof to request the user reissue the command.

When the processor 130 determines that the voice command is valid for multiple voice controllable systems 110 in Step 230, the processor 130 determines when one of the voice controllable systems 110 can be selected as the most likely intended target of the voice command. (Step 265). The processor 130 can determine the most likely intended target of the voice command based upon one or more of a user profile, data from one of the voice controllable systems 110, data from another system of the vehicle, or any combination thereof.

In one embodiment, for example, the memory 150 may store a user profile corresponding to each user of the vehicle 100. The user profile may store statistical data on voice commands issued by the respective user as well as the system ultimately selected by the user to execute the command. Accordingly, the processor 130 may select the most frequently used voice controllable system 110 for the specific voice command as the most likely intended target of the voice command.

In another embodiment, for example, one or more of the voice controllable systems 110 or other systems in the vehicle 100 may provide vehicle status data to the processor. The status data can include, but is not limited to, a vehicle status, a navigation status, and voice controllable system activity.

A vehicle status may a be, for example, a fuel level, a signal strength of a radio frequency being received by the vehicle 100, a landing gear position, a tire pressure, a decent rate, an accent rate, throttle position, flap settings, or any other data collected by the various systems of the vehicle. The memory 150 may store a table indicating which voice controllable system 110 is the most likely target of a command when each vehicle status is present.

The navigation status may include, but are not limited to, distance to destination, position of the vehicle, landing pattern status, a phase of flight, or the like. For example, if the vehicle 100 is an aircraft and a flight management system (FMS) indicates that the vehicle is in a landing pattern, the processor 130 may determine that a voice controllable radio system is the most likely voice controllable system 110 as pilots are often in communication with air traffic control during a landing stage. If an aircraft is in approach phase, the processor may determine that a voice controllable charts system may be the most likely target of a command as a user is likely to be asking for charts to look up approach procedures, airport runways, or the like.

The voice controllable system activity may indicate which systems have recently been active. For example, if a voice controllable radio communication system has recently received a message from someone outside of the vehicle 100 (e.g., air traffic control), the processor 130 may determine that a voice controllable radio system is the most likely voice controllable system 110 as a user is likely to want to respond to the message. A system state indicating a failure of, or problem with, a non-critical system, may indicate to the processor 130 that a certain voice controllable systems 110 that could be used for diagnosis is the most likely intended target of the voice command.

In another embodiment, for example, a combination of a user profile and data from one or more of the voice controllable systems 110 or other systems in the vehicle 100 may be used by the processor to determine the most likely voice controllable system 110. For example, the user profile data may indicate the voice controllable system 110 each specific user utilizes most corresponding to each vehicle status, each navigation status, and each voice controllable system activity such that the selected voice controllable system 110 by the processor 130 is tailored based upon the habits of each specific user. The processor 130, for example, could use different levels of tailoring based not only the voice controllable system based and habits, but what magnification level or page of that system when first entered that a user prefers. For example, a first user at one hundred and fifty miles out from an airport may prefers to review charts at a particular magnification level and perhaps focused on the radio frequency table of the chart, centered with the entire chart in view and at straight-and-level cruise, whereas a second user may prefer to review weather at a particular magnification level for possible re-routing at a similar distance from the airport.

When the processor cannot determine a voice controllable system 110 the user is intending to target with the received voice command, the processor 130 may generate audio data, visual data, or a combination thereof requesting that the user either verbally indicate the intended voice controllable system 110 or use a gesture to indicate the voice controllable system 110. (Step 270). The audio data may be output to a speaker (not illustrated) in the vehicle. The visual data may be indicated on a display dedicated to the intent managing system 120 (e.g., displaying a message on the display asking the user to indicate the intended target) or on a display of one or more of the voice controllable systems 110. For example, if two voice controllable systems 110 both include displays and the received voice command is a valid voice command for both of the voice controllable systems 110, the processor 130 may generate display data (or instructions to generate display data) for the respective voice controllable systems 110 to indicate that both systems could execute the voice command. The visual data could be, for example, blinking the respective displays, changing a background color, animations, or the like, or any combination thereof.

The processor 130 then processes data from one or more of the input systems 140 to determine the user's intended target of the voice command. (Step 275). When the user verbally responds, the processor 130 may perform speech recognition on the received audio data, transforming the speech into text to determine which of the voice controllable systems 110 the user intended to target. The memory 150 may store one or more names for each of the voice controllable systems 110. For example, a flight management system may be referred to as a "flight management system" or as "FMS." Accordingly, upon receipt of either the official name for a voice controllable system 110 or a short-hand or nickname of the voice controllable system 110, the processor 130 can accurately select the appropriate intended system. When the user visually indicates the intended target, for example, by pointing to the intended voice controllable system or any of the other facial, body or eye movements discussed herein, or the like, the processor 130 processes the data from the respective input system 140 (i.e., an optical camera, an infrared camera, or the like) to determine the voice controllable system 110 the user intended to target with the voice command.

The processor 130, when the processor 130 can determine a most likely intended target in Step 265 or when the user has indicated the intended target in Step 275, indicates a selection of the respective voice controllable system 110 as discussed above. (Step 280). The processor 130 then requests confirmation from the user and determines if the user confirms the command in a similar manner as discussed in Step 220. (Step 285).

When the user denies the confirmation of the intended voice controllable system 110, the processor 130 returns to Step 265 to determine if another voice controllable system 110 could be a most likely intended target of the received voice command. If the processor 130 could select a second most likely system, the processor 130 then visually indicates the respective voice controllable system in Step 280. If the processor 130 cannot determine a second most likely intended voice controllable system the processor requests that the user specify the intended system in Step 265.

When the user confirms the command in Step 285, the processor 130 causes the voice command at the selected voice controllable system 110 to execute and then returns to step 205 to await further voice commands. (Step 290). In one embodiment, for example, the processor 130 may itself execute the voice command when the processor 130 is part of the corresponding voice controllable system 110. In other embodiments, for example, the processor 130 may generate instructions based upon the received voice command and transmit the instructions to the respective voice controllable system 110 for execution.

While the intent managing system 120 is described herein in the context of a vehicle, the intent managing system 120 could be implemented in a variety of settings, including, but not limited to, factories, power plants, or any other facility or operation which utilizes multiple voice controllable input systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An intent managing system for an aircraft comprising a plurality of voice controllable systems, the intent managing system comprising:
   at least one input system;
   a memory configured to store valid voice commands for each of the plurality of voice controllable systems; and
   a processor communicatively coupled to the at least one input system and the memory, the processor configured to:
   receive a voice command from a user from the at least one input system;
   determine how many of the plurality of voice controllable systems include the received voice command as a valid voice command;
   select, when the received voice command is a valid voice command for only one of the plurality of voice controllable systems, the one of the plurality of voice controllable systems;
   select, when the received voice command is a valid voice command for a plurality of the plurality of voice controllable systems, a most frequently selected one of the plurality of voice controllable systems by the user for a current phase of flight of the aircraft and a current status of the aircraft based upon a user profile and data from one or more of the plurality of voice controllable systems, the user profile indicating the most frequently selected one of the plurality of voice controllable systems for each phase of flight of the aircraft and the most frequently selected one of the plurality of voice controllable systems for each status of the aircraft;
   generate at least one of a visual indication of the selected one of the plurality of voice controllable systems and an audio indication of the selected one of the plurality of voice controllable systems;
   receive, from the at least one input system, confirmation of the selected one of the plurality of voice controllable systems; and
   execute the received voice command at the selected one of the plurality of voice controllable systems when the confirmation is received.

2. The intent managing system of claim 1, wherein the at least one input system includes a camera, and the confirmation is a predetermined number of eye blinks.

3. The intent managing system of claim 1, wherein the at least one input system includes a camera, and the confirmation is a predetermined hand gesture.

4. The intent managing system of claim 1, wherein the at least one input system includes a camera, and the confirmation is a predetermined body shift.

5. The intent managing system of claim 1, wherein the at least one input system includes a camera, and the confirmation is a predetermined head shift.

6. The intent managing system of claim 1, wherein the at least one input system includes a camera, and the confirmation is a predetermined facial expression.

7. The intent managing system of claim 1, wherein the at least one input system includes at least one weight sensor, and the confirmation is a predetermined weight shift.

8. The intent managing system of claim 1, wherein the at least one input system includes at least one electromyography system, and the confirmation is a muscle movement.

9. The intent managing system of claim 1, wherein the user profile indicates a most frequently selected one of the plurality of voice controllable systems for each valid voice command, and the processor is further configured to select the one of the plurality of voice controllable systems based upon the most frequently selected one of the plurality of voice controllable systems for the received voice command.

10. The intent managing system of claim 9, wherein the data from one or more of the plurality of voice controllable systems includes one or more of the aircraft status, a navigation status, and voice controllable system activity and the user profile indicates a most frequently selected one of the plurality of voice controllable systems for each of the one or more of the aircraft status, the navigation status, and the voice controllable system activity.

11. A method for operating an intent managing system for an aircraft comprising a plurality of voice controllable systems, the method comprising:
   receiving, by a processor, a voice command from a user from an input system;
   determining, by the processor, how many of the plurality of voice controllable systems include the received voice command as a valid voice command;
   selecting, by the processor, one of the plurality of voice controllable systems when the received voice command is a valid voice command for only the one of the plurality of voice controllable systems;
   selecting, by the processor, a most frequently selected one of the plurality of voice controllable systems by the user for a current phase of flight of the aircraft and a current status of the aircraft based upon a user profile and data from one or more of the plurality of voice controllable systems when the received voice command is a valid voice command for a plurality of the plurality of voice controllable systems, the user profile indicating the most frequently selected one of the plurality of voice controllable systems for each phase of flight of the aircraft and the most frequently selected one of the plurality of voice controllable systems for each status of the aircraft;

generating, by the processor, at least one of a visual indication of the selected one of the plurality of voice controllable systems and an audio indication of the selected one of the plurality of voice controllable systems;

receiving, by the processor from the input system, confirmation of the selected one of the plurality of voice controllable systems; and executing, by the processor, the received voice command at the selected one of the plurality of voice controllable systems when the confirmation is received.

12. The method of claim 11, wherein the input system includes a camera, and the confirmation is a predetermined number of eye blinks.

13. The method of claim 11, wherein the input system includes a camera, and the confirmation is a predetermined hand gesture.

14. The method of claim 11, wherein the input system includes a camera, and the confirmation is a predetermined body shift.

15. The method of claim 11, wherein the input system includes a camera, and the confirmation is a predetermined head shift.

16. The method of claim 11, wherein the input system includes a camera, and the confirmation is a predetermined facial expression.

17. The method of claim 11, wherein the input system includes at least one weight sensor, and the confirmation is a predetermined weight shift.

18. The method of claim 11, wherein the input system includes at least one electromyography system, and the confirmation is a muscle movement.

19. The method of claim 11, wherein the user profile indicates a most frequently selected one of the plurality of voice controllable systems for each valid voice command by a user, the method further comprising selecting, by the processor, the one of the plurality of voice controllable systems based upon the most frequently selected one of the plurality of voice controllable systems by the user for the received voice command.

20. The method of claim 19, wherein the data from one or more of the plurality of voice controllable systems includes one or more of the aircraft status, a navigation status, and voice controllable system activity, the method further comprising selecting, by the processor, the one of the plurality of voice controllable systems based upon the most frequently selected one of the plurality of voice controllable systems by the user for the aircraft status, the navigation status, and the voice controllable system activity.

* * * * *